March 26, 1935.  S. LENHER  1,995,991
DIRECT OXIDATION OF OLEFINE HYDROCARBONS
Filed April 28, 1931
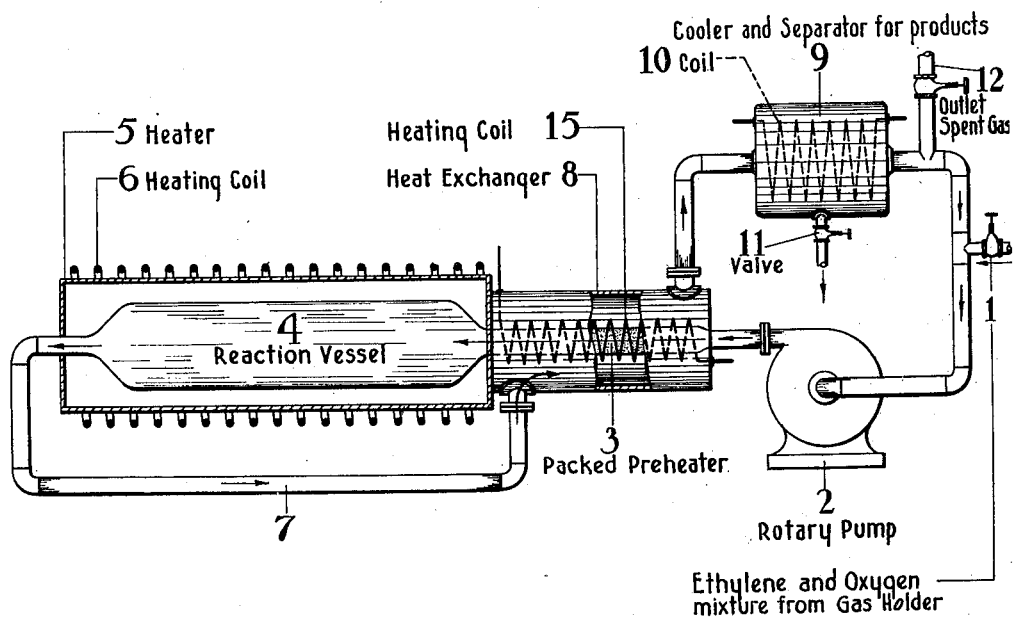
Samuel Lenher, INVENTOR
BY HIS ATTORNEY
Ralph F. Miller Patented Mar. 26, 1935

1,995,991

UNITED STATES PATENT OFFICE 1,995,991

DIRECT OXIDATION OF OLEFINE HYDROCARBONS

Samuel Lenher, Wilmington, Del., assignor to E. I. du Pont de Nemours & Company, Wilmington, Del., a corporation of Delaware Application April 28, 1931, Serial No. 533,561

10 Claims. (Cl. 260—156.5)

This invention relates to the oxidation of the olefine hydrocarbons, and more particularly it relates to an improved process involving the direct oxidation by ordinary oxygen of these hydrocarbons for the production of ethylenic oxides and other valuable compounds not obtainable by direct oxidation processes as heretofore practiced.

In so far as I am aware, the prior art concerning the oxidation of olefine hydrocarbons contains no reference to a process of the direct oxidation of the olefine hydrocarbons by ordinary oxygen, or air, to the new and valuable compounds above mentioned. The ethylene oxides and their derivatives and related compounds and polymers have not been previously obtained by direct reaction between the olefines and ordinary oxygen. The scientific literature on the direct thermal oxidation of the olefines is summarized in Bone and Townend's "Flame and Combustion in Gases", Longmans Green & Co., London, 1927. On page 366 Bone states that in his own experiments with Wheeler (Bone and Wheeler, Journal of the Chemical Society 85, 1637, 1904) on the direct slow thermal oxidation of ethylene no ethylene oxide could be detected. Blair and Wheeler in 1922 observed that acetaldehyde was formed in the oxidation of ethylene, though they did not find ethylene oxide or glycol (J. Soc. Chem. Ind. 41, 303T, (1922); 42, 415T, (1923)). In a more recent work on the oxidation of ethylene (Thompson and Hinshelwood, Proc. Roy. Soc. London 118A, 170, 1928) no ethylene oxide was found. The technical literature on the direct oxidation of the olefines, while it contains a large number of references on the production of formaldehyde and on catalyzed processes, has but one reference which bears on the present process in that it deals with the oxidation of an olefine to a glycol. This is the process of Plauson's Forschungsinstitut (B. m. b. H. in Hamburg, D. R. P. 344,615 (1920)) on the oxidation of ethylene to glycol and formaldehyde by use of a mixture of ethylene-containing gas with ozonized air or ozonized oxygen in the presence of water vapor and a porous contact mass at about 100° C. The contact mass may be simply wet or may be impregnated with a catalyst as potassium permanganate or perchlorate, or osmic and tungstic acids.

The prior processes for the oxidation of the olefines to products other than formaldehyde in which oxygen is used in a more active form than ordinary oxygen or air, i. e., ozone, potassium permanganate, potassium perchlorate, or other powerful oxidizing agents, are not operated commercially because of the cost of the reagents and for other reasons. It was not believed heretofore that the ethylene oxides and other valuable compounds disclosed herein could be produced by the direct oxidation of the olefines by ordinary oxygen, and all efforts were directed to the invention of indirect process for the production of these compounds, i. e., processes whereby ethylene is reacted with such chemicals as chlorine or hypochlorous acid to form ethylene dichloride or ethylene chlorhydrin, respectively, from which compounds the ethylene oxides and glycols and related compounds can be prepared.

The olefine hydrocarbons used in the practice of my invention are those containing one or more double bonds. These hydrocarbons include the normal olefines, ethylene, propylene, butylene and the higher members of the series, the diolefines as propadiene, butadiene, isoprene and the higher members of the series, and cyclic hydrocarbons containing a double bond or double bonds as cyclohexene, cyclohexadiene and their homologues.

This invention has as an object a new process for producing olefine oxides. A further object is a process for the direct oxidation of olefine hydrocarbons by ordinary oxygen or air to produce the ethylenic oxides of the hydrocarbons and their derivatives, such as glycols and polyglycols, higher ethers, esters, oxide polymers, and related compounds, and also aldehydes and acids containing the same number or less of carbon atoms as the hydrocarbon oxidized, peroxide compounds as peracids and peraldehydes, as well as the acids, aldehydes, the oxides of carbon and water which have been obtained from the processes described in the prior art.

These objects are accomplished by the following invention, in which an olefine hydrocarbon, or olefine hydrocarbon containing gas, is reacted with ordinary oxygen at elevated temperature in a reaction vessel and the olefine oxides separated from the resulting products.

I have discovered that the direct oxidation of the olefines for the production of the valuable products previously enumerated is, when conducted in the gas phase, mainly a homogeneous gas reaction which proceeds rapidly without explosion or inflammation in the free space of an unpacked reaction tube or vessel, whereas this reaction does not take place appreciably, or at all, in packed vessels or in vessels having a small ratio of free space to surface, such as were used in prior attempts to cause oxidation of the olefines by ordinary oxygen or air.

The unfavorable effect of increase of exposed surface on the reaction of ethylene with oxygen is shown by experiments carried out in empty and in packed vessels. I have found that ethylene reacts readily with oxygen in unpacked vessels above 360° C. to form ethylene oxide and the other reaction products listed above, whereas in the same vessels packed with pieces of the material of which the vessel is made, other conditions being the same, ethylene does not react with oxygen at 400° C. and does not begin to react to any appreciable extent with oxygen until temperatures above 500° C. are used.

Ethylene oxide was identified in these and the following examples by its characteristic boiling point, 10.5°, by its conversion to ethylene glycol, b. p. 195°, and by its characteristic reaction with magnesium chloride (Mulliken, Identification of Pure Organic Compounds, John Wiley & Sons, N. Y. C. 1905, vol. 1, p. 160). Ethylene glycol was identified by its characteristic boiling point, 195°, and by the preparation of ethylene glycol dibenzoate, melting point 71°. (Mulliken, vol. 1, p. 169). The other compounds were similarly identified by well-known chemical tests.

These experiments show that the greater part of the direct oxidation reaction takes place in free space and that a high ratio of free space to surface in the reaction vessel is favorable to the formation of the valuable liquid products obtained by this process. Another way of expressing this same fact is to say that the direct oxidation of the olefines is mainly a homogeneous gas reaction.

The discovery of the homogeneous nature of the reaction and the necessity of using a reaction vessel for this process which affords the requisite amount of free space, is strikingly illustrated by the following example:

Example I

Mixtures of 20% oxygen—80% ethylene were passed through a cylindrical pyrex tube, 1" x 12", packed with 4 mesh broken pyrex glass which was heated to 450°. The volume of the free space in the tube was 57.5 cc. The times of contact were from 1.5 seconds to 70 seconds. No measureable amount of ethylene was oxidized or decomposed. The gas mixture at 450° from this packed tube was then passed directly into an empty cylindrical pyrex vessel, 2½" x 16", of 1 liter volume heated to 315°. The time of contact was 25 seconds. Reaction took place in the unpacked vessel giving the following yield of liquid products based on the ethylene oxidized, ethylene oxide 11.6%, formaldehyde 34.7%, formic acid 6.9%.

This example demonstrates the desirability of carrying out this process in unpacked vessels having a high ratio of volume : surface. In this example, while no measurable oxidation of ethylene was detected at 450° in the packed vessel, even when the gases were heated 70 seconds, the reaction proceeded rapidly in the empty 1 liter vessel whose walls were at 315° C. (135° lower temperature than the packed vessel) with a time of contact of 25 seconds. This observation is the basis for the apparatus shown in the drawing.

The single figure in the drawing illustrates, in diagrammatic form, a suitable apparatus for carrying out the invention by the re-circulation process.

The reaction mixture of olefine hydrocarbon and oxygen or air is fed from storage into the system through inlet 1 by a rotary pump 2, which circulates the gas through the apparatus. The gas first passes through a preheater 3 packed preferably with fragments of glass, porcelain, clay or silicious material, so as to cause uniform heating of the gas mixture. These fragments are packed as closely as is practicable without preventing the free passage of the gas. The gas mixture is brought to a temperature above the reaction temperature, i. e., 300° to 600° C. The gases do not, however, react in the preheater because the packing, (low ratio of free space to surface), effectively stops oxidation. The gases pass from the preheater directly into the reaction vessel 4, where the temperature controls the speed of the reaction. The walls of this vessel are maintained at a temperature which gives the maximum rate of the desired reaction; a high temperature favors the heterogeneous reaction producing other products than the olefine oxides, while too low a temperature cools the gases below the point of rapid homogeneous reaction. In the reaction vessel the olefine-oxygen mixture reacts to form the products previously enumerated.

The temperature in the reaction vessel may vary from 250 to 600° C., depending on the temperature of the preheater, the time of contact, (i. e., the rate of flow or circulation), and the composition of the gas mixture. The preheater 3 and the heater 5 for the reaction vessel may be heated by any suitable means, heating coils 15 and 6 being shown in the present instance for this purpose. The hot reacted gases pass from the reaction vessel through a conduit 7 into a heat exchanger 8, which surrounds the preheater. The circulating gases pass from the heat exchanger into a cooler and separator for the products, which may consist of a vessel 9, cooled by any suitable means, as for instance, by a cooling coil 10. The gases which have not been condensed are again drawn through the system by the pump 2, past the inlet 1, where the mixture is enriched by the fresh gas from storage. Spent gas is drawn off through the valved outlet 12 when necessary. A valve 11 may be provided for drawing off the liquid products.

The size and shape of the reaction vessel is important in the present process. I have found that the yield of ethylene oxide is increased by increasing the size of the reaction vessel, i. e., increasing the ratio of free space to surface. Thus, when the reaction is carried out with a 65 cc. glass reaction vessel only small amounts of ethylene oxide are obtained, whereas the use of a liter vessel, other conditions being equal, greatly increases the yield, the yield being 10 to 18% of the ethylene consumed. The most efficient reaction vessel is one in which there is a high ratio of volume to surface, and through which the gas mixture can pass freely without prolonged contact with the heated walls. For example, if we consider cylindrical converters of the same length, a vessel with a 3 foot radius and a ratio of volume : surface of 1.25 is more efficient for the operation of this process than one with a radius of ½ foot and a ratio of volume : surface of 0.20, all other things being equal. Or, if we consider cylindrical converters of the same radius, a vessel 10 feet long with a ratio of volume : surface of 0.80 is more suitable for this process than one 1 foot long and a ratio of volume : surface of 0.33, other things being equal. An unpacked tube of about 1 inch in diameter represents about the smallest vessel affording a high enough ratio of free space to surface to enable the process to be carried out in an experimental way for the production of any appreciable quantity of ethylene oxide. This discovery that large reaction vessels give better yields than small ones, together with the discovery that an increase of exposed surface is unfavorable to the production of ethylene oxide shows that in carrying out the process on a large scale, that is, using large converters where the ratio of free space to surface is high, the yields of ethylene oxide will be greater than with operation on a small scale. For the commercial operation of this process a spherical or cylindrical shaped converter of 100 to 150 cubic feet capacity with a ratio of volume to surface of about 1.1 is practicable.

The ratio of oxygen to olefine in the gas mixture has also a marked effect upon the results obtained from the reaction. The following example shows the effect of varying the ratio of oxygen to ethylene.

Example II

Effect of concentration on reaction of $C_2H_4$ with $O_2$ in a cylindrical glass vessel

| Temp. °C. | Composition of gas | | Reaction products in per cent conversion | | | |
|---|---|---|---|---|---|---|
| | Per cent $O_2$ | Per cent $C_2H_4$ | Liquid products | Carbon monoxide | Carbon dioxide | Hydrogen |
| 370 | 75 | 25 | 1.4 | 0.5 | 0.0 | 0.0 |
| 370 | 25 | 75 | 30.1 | 9.4 | 0.9 | 1.1 |

This example shows the dependence of the reaction on the hydrocarbon concentration, a high concentration of hydrocarbon being favorable to a high rate of reaction to form oxidation products. A three-fold increase in the concentration of the hydrocarbon brings about a twenty-fold increase in the amount of oxidation. It will be apparent from this example that use of a relatively high hydrocarbon concentration and of a relatively low oxygen concentration is a preferred operating condition for this process.

The direct oxidation of propylene by ordinary oxygen yields valuable oxidation products which have not been obtained by the prior processes for the direct oxidation of this hydrocarbon as shown by the following example:

Example III

A mixture of 85% propylene and 15% oxygen was heated for 28 seconds in a cylindrical glass reaction vessel at temperatures from 270–360°. The reaction products were found to be propylene oxide, propylene glycol, propionaldehyde, propionic acid, and acetic and formic acids and aldehydes, the oxides of carbon and water. The propylene oxide was identified as propylene glycol, boiling point 188°, by hydrating the propylene oxide with dilute acid. Propylene glycol was identified by its characteristic boiling point, 188°, and by accepted chemical tests (G. Deniges, Annales de Chimie et de Physique (8) 18, 174 (1909)). The other products were identified by the usual chemical tests.

The process may be operated at temperatures of 250 to 600° C. with times of contact of from 100 seconds to a fraction of a second. For commercial operation times of contact of from 5 seconds to a fraction of a second are preferred. It will be clear from the examples that the reaction temperature and time of contact are dependent not only on each other but also on the important factors of gas composition (ratio of olefine:oxygen, and presence of foreign gases) and on the shape and size of the converter; however, the relation of the time of contact to the reaction temperature may be expressed in general, thus, for the operation of this process at low temperatures of 250–350°, times of contact of as long as 10 seconds may be used, at high temperatures of 450–600° short times of contact of 2 seconds or less must be used. With a gas mixture rich in hydrocarbon (a high ratio of hydrocarbon:oxygen) which favors a high reaction rate (Example II) shorter times of contact may be used at one temperature than with mixtures having a lower hydrocarbon content.

Example IV shows the results obtained by conducting the process as a re-circulation process with short times of contact in an apparatus of the type shown in the drawing.

Example IV

The following table shows the results of the reaction of $C_2H_4$ with $O_2$ in a re-circulation apparatus (see drawing) at high temperatures and short times of contact.

| Temperature of preheater | Temperature of reaction vessel | Time of contact in seconds | Liquid reaction products in per cent ethylene oxidized | | |
|---|---|---|---|---|---|
| | | | Ethylene oxide | Formaldehyde and acetaldehyde | Formic acid |
| 430° | 415° | 3.0 | 21.0 | 65.7 | 3.2 |
| 460 | 440 | 3.0 | 18.9 | 66.2 | 4.0 |
| 525 | 480 | 3.0 | 15.4 | 22.4 | 4.3 |
| 500 | 500 | 2.9 | 17.6 | 18.7 | 2.9 |

Any olefine hydrocarbon fulfilling the definition previously given may be used in this oxidation process to yield the corresponding olefine oxide, its derivatives and related compounds, aldehydes, acid and their decomposition products. For example, if the diolefine hydrocarbon, butadiene, were substituted for ethylene in this process the compound butadiene dioxide, and its derivatives, as erythritol, and related compounds will be obtained. Of, if the the cyclic hydrocarbon, cyclohexene, were substituted for ethylene in this process cyclohexene oxide and its derivatives will be formed.

While the reaction on which this process is based has been found to be mainly a homogeneous gas reaction, the effect of the material of which the walls of the reaction vessel are made on the reaction shows that a part of the reaction takes place on the surface of the reaction vessel. It has been found that using reaction vessels of different materials or coated with different substances influences the yields of the products of this process. This process of the direct oxidation of the olefines to olefine oxides and the other liquid products listed above is best carried out in vessels of a silicious material as glass, porcelain, or clay, or lined with such material with or without metals of the alkali metal or alkaline earth metal groups, or their compounds.

This process permits of a number of variations or modifications. The process may be carried out using a pure olefine hydrocarbon gas, a mixture of hydrocarbons, or a gas containing an olefine hydrocarbon, with ordinary oxygen or air. It is preferred to use a single hydrocarbon with oxygen, but the process may be operated with mixtures. The process may be carried out using any proportion of hydrocarbon with air or oxygen, but the preferred operating condition is using a high hydrocarbon concentration and a relatively low oxygen concentration. It is preferred to operate this process with gases containing 50% or higher concentration of ethylene. The use of ethylene concentrations outside the explosion limits for ethylene-oxygen mixtures is preferred, but by operating with due care at a sufficiently low temperature the process may be carried out with any ethylene-oxygen mixture without explosion or inflammation. Another modification of this process consists in preheating the olefine gas and oxygen separately, or merely preheating the oxygen, introducing the hot gases into a reaction vessel, and allowing the hot gases to react directly at the point of mixing.

Instead of operating at atmospheric pressure as in the examples mentioned, the process may be carried out below or above atmospheric pressure. It is preferred to operate at atmospheric pressure or at pressures greater than one atmosphere. There are advantages to be gained by operating at increased pressures. Since the oxidation of ethylene to ethylene oxide proceeds with a decrease in volume, $2C_2H_4+O_2\rightarrow 2C_2H_4O$ (ethylene oxide), the oxidation of ethylene to formaldehyde with no volume change, $C_2H_4+O_2\rightarrow 2HCHO$, and the formation of formic acid with a decrease in volume $C_2H_4+2O_2\rightarrow 2HCOOH$ it is clear that increase in pressure is favorable to the oxidation reaction, and especially to the formation of ethylene oxide. Other advantages resulting from operating the process under pressure are the increase in capacity permitting larger amounts of material to be handled, improvement of heat transfer during the reaction which makes possible closer control of the process, and the reduction in the size and cost of the equipment.

This process may be carried out using other means of reacting the olefines with oxygen, than heating; such means are the use of the silent electric discharge, alpha particles and ultra-violet light.

While the preferred and most practicable method of carrying out the invention consists in reacting the olefines in the gas phase, the process comprehends broadly the discovery that olefine oxides may be produced by the direct oxidation of an olefine hydrocarbon, in either the gas or liquid phase. Thus, in operating the process in the liquid phase ordinary oxygen can be reacted with cyclohexene, as for instance by passing it through this liquid hydrocarbon and separating the corresponding olefine oxide from the reaction products.

It will be apparent from the foregoing that I have developed a new process for the direct oxidation of the olefine hydrocarbons by ordinary oxygen or air to the ethylene oxides, glycols and their derivatives and related compounds. These compounds may now be produced in unlimited quantities and at less cost than formerly inasmuch as the present process may be carried out with inexpensive apparatus and without the use of the expensive oxidizing agents which have contributed to prevent the commercial development of prior processes.

As many apparently widely different embodiments of this invention may be made without departing from the spirit and scope thereof, it is to be understood that I do not limit myself to the specific embodiments thereof except as defined in the following claims.

I claim:

1. A process for the direct oxidation of hydrocarbons selected from the class consisting of olefines, diolefines, and cyclic hydrocarbons containing at least one double bond which comprises causing reaction of said hydrocarbon and oxygen in the gas phase by heating the hydrocarbon gas and ordinary oxygen in free space in a reaction vessel having a volume to surface ratio not less than that of a tube one inch in diameter within the temperature range of 250° C. to 600° C. for a period of time within the range of a fraction of a second to 100 seconds.

2. A process for oxidizing olefines which comprises passing a hydrocarbon gas and oxygen through a packed reaction vessel, heating the gaseous mixture passing through the vessel within the temperature range of 250° C. to 600° C. and passing the heated gas from said packed vessel through an unpacked vessel wherein the temperature of gas is maintained within said temperature range, said hydrocarbon being selected from the class consisting of olefines, diolefines, and cyclic hydrocarbons containing at least one double bond.

3. The process set forth in claim 2 in which the mixture of hydrocarbon and oxygen consists of at least 50% of the hydrocarbon.

4. A process for oxidizing olefines, which comprises drawing a hydrocarbon gas and oxygen from a source of supply, forcing the gas through a packed preheater into a reaction vessel having a ratio of free space to exposed surface sufficiently high to cause oxidation of the hydrocarbon to take place, the gaseous mixture being heated within the temperature range of 250° C. to 600° C. while passing through said preheater and reaction vessel, cooling the oxidation products and separating the liquid products, and passing the non-condensed gases to the preheater again with the incoming hydrocarbon and oxygen, the rate of flow of the gases through the reaction vessel being such as to heat the gaseous mixture for a time not more than five seconds, said hydrocarbon being selected from the class consisting of olefines, diolefines, and cyclic hydrocarbons containing at least one double bond.

5. A process for the direct oxidation of olefines which comprises reacting at elevated temperature olefine and oxygen in the gas phase in free space in a reaction vessel having a volume to surface ratio not less than that of a tube one inch in diameter, said temperature being within the range of 250° C. to 600° C., and passing the gaseous mixture through the reaction zone at a speed such that the end products contain a substantial amount of olefine oxide.

6. The process set forth in claim 5 in which the olefine is ethylene.

7. A process for oxidizing olefines which comprises passing a mixture of olefine gas and oxygen through a packed preheater, and passing the gas from the preheater into a reaction vessel having a volume to space ratio not less than that of a tube one inch in diameter, the gaseous mixture entering the reaction vessel being heated by said preheater within the range of 250° C. to 600° C.

8. The process set forth in claim 7 in which the olefine is ethylene.

9. A process for the direct oxidation of olefines which comprises separately preheating the olefine gas and oxygen, introducing the separately preheated gases into a reaction chamber having a volume to surface ratio not less than that of a tube one inch in diameter, said gases being preheated to a temperature such that the reaction temperature of the gaseous mixture entering the reaction vessel is within the range of 250° C. to 600° C., and passing the gaseous mixture at a temperature within said range through the reaction zone at a speed such that the end products contain a substantial amount of olefine oxide.

10. The process set forth in claim 9 in which the olefine is ethylene.

SAMUEL LENHER.